United States Patent
Lowe et al.

(10) Patent No.: US 9,989,182 B2
(45) Date of Patent: Jun. 5, 2018

(54) METHOD OF FORMING A SEALED JOINT BETWEEN A TUBULAR ARTICLE AND A SHEET ARTICLE

(71) Applicant: Sunspin Pty Ltd., Karrinyup (AU)

(72) Inventors: Rodney William Lowe, Cranbrook (AU); Harry Suehrcke, Karrinyup (AU)

(73) Assignee: SUNSPIN PTY LTD., Karrinyup (AU)

( * ) Notice: Subject to any disclaimer, the term of this patent is extended or adjusted under 35 U.S.C. 154(b) by 0 days. days.

(21) Appl. No.: 14/899,970

(22) PCT Filed: Jun. 30, 2015

(86) PCT No.: PCT/AU2015/000381
§ 371 (c)(1),
(2) Date: Dec. 18, 2015

(87) PCT Pub. No.: WO2016/000023
PCT Pub. Date: Jan. 7, 2016

(65) Prior Publication Data
US 2017/0219150 A1    Aug. 3, 2017

(30) Foreign Application Priority Data
Jun. 30, 2014   (AU) .............................. 2014902508

(51) Int. Cl.
*B23K 31/02* (2006.01)
*F16L 41/08* (2006.01)
(Continued)

(52) U.S. Cl.
CPC .......... *F16L 41/084* (2013.01); *B23K 9/0035* (2013.01); *B23K 15/00* (2013.01); *B23K 26/21* (2015.10); *B23K 2201/04* (2013.01)

(58) Field of Classification Search
CPC ....... F16L 41/084; B23K 15/00; B23K 26/21; B23K 9/0035
See application file for complete search history.

(56) References Cited

U.S. PATENT DOCUMENTS 1,857,526 A  *  5/1932  Burnish  ............... B23K 33/004
                                                     219/137 R
1,857,912 A  *  5/1932  Jones  .................... F22B 37/104
                                                     122/511

(Continued)

FOREIGN PATENT DOCUMENTS

CN         202098676       1/2012
DE         3614237 A1  * 10/1987  ........... B23K 9/0288

(Continued)

OTHER PUBLICATIONS

Ontool GmbH, "Thermdrill—the really stable threaded bushing," www.thermdrill.com.

*Primary Examiner* — Kiley Stoner
(74) *Attorney, Agent, or Firm* — Greenberg Traurig, P.A.; Joshua R. Brown; Corinne M. LaGosh

(57) ABSTRACT

A method of forming a sealed joint between a tubular article (10) and a thin sheet article (14) wherein the articles (10, 14) are made of metallic materials that are capable of fusion welding together. One step in the method involves locating an end of the tubular article in a collar (20) surrounding a hole (12) formed in the thin sheet article (14). An end (22) of the tubular article (14) is positioned to lie substantially flush with a proximal end (24) of the collar (20). Next the ends (22, 24) of the collar and the tubular article are fusion welded forming a circumferential bead (26) creating an integral joint. Consequently in effect the previously separate a tubular article (10) and a thin sheet article (14) become a single piece.

20 Claims, 3 Drawing Sheets

(51) Int. Cl.
  *B23K 9/00*       (2006.01)
  *B23K 26/21*      (2014.01)
  *B23K 15/00*      (2006.01)
  *B23K 101/04*     (2006.01)

(56) References Cited

U.S. PATENT DOCUMENTS

| | | | | |
|---|---|---|---|---|
| 1,920,534 A * | 8/1933 | Swearingen | B01J 19/02 | 196/133 |
| 1,933,772 A * | 11/1933 | Stresau | F17C 1/00 | 219/137 R |
| 1,978,608 A * | 10/1934 | Straty | B01J 3/002 | 219/137 R |
| 2,011,719 A * | 8/1935 | Kidd | B23K 9/0026 | 219/137 R |
| 2,069,937 A * | 2/1937 | Black | B21D 51/40 | 220/288 |
| 2,106,404 A * | 1/1938 | Ewing | F16L 41/084 | 138/171 |
| 2,266,609 A * | 12/1941 | Martin | F16L 41/082 | 220/567.3 |
| 2,349,792 A * | 5/1944 | Rosenblad | F16L 5/00 | 165/173 |
| 2,353,477 A * | 7/1944 | Koppel | F16L 41/084 | 285/205 |
| 2,368,391 A * | 1/1945 | Young | F28F 9/185 | 165/134.1 |
| 2,374,733 A * | 5/1945 | Crawford | F16L 41/084 | 219/137 R |
| 2,385,991 A * | 10/1945 | Huntoon | F16B 37/02 | 219/93 |
| 2,623,974 A * | 12/1952 | Prucha | F16B 37/061 | 219/93 |
| 2,710,443 A * | 6/1955 | Webb | B23K 9/0288 | 188/77 R |
| 2,749,579 A * | 6/1956 | Shaw | C03B 23/245 | 228/175 |
| 2,788,232 A * | 4/1957 | Stadthaus | F16L 41/084 | 285/201 |
| 2,867,036 A * | 1/1959 | Hovelmann | B23K 9/0288 | 228/165 |
| 2,996,600 A * | 8/1961 | Gardner, Jr. | B23K 9/0288 | 219/137 R |
| 3,062,949 A * | 11/1962 | Lippart | B23K 9/0288 | 219/125.11 |
| 3,064,707 A * | 11/1962 | Walts | B21C 37/292 | 29/890.043 |
| 3,078,551 A * | 2/1963 | Patriarca | B21D 39/06 | 228/134 |
| 3,147,361 A * | 9/1964 | Franke | H01J 5/40 | 219/85.22 |
| 3,349,465 A * | 10/1967 | La Pan | B21D 39/06 | 165/178 |
| 3,473,215 A * | 10/1969 | Stevens | B23K 9/0288 | 228/165 |
| 3,939,683 A | 2/1976 | Van Geffen | | |
| 4,049,185 A * | 9/1977 | Nippert | B23K 1/18 | 174/535 |
| 4,188,140 A * | 2/1980 | Clemens | B23K 33/004 | 285/189 |
| 4,319,121 A * | 3/1982 | Yoshida | B23K 15/00 | 219/121.14 |
| 4,677,271 A * | 6/1987 | Opprecht | B23K 11/002 | 219/91.23 |
| 4,744,505 A * | 5/1988 | Calleson | B21D 39/06 | 165/173 |
| 4,828,524 A * | 5/1989 | Fendley | H01J 9/142 | 219/121.64 |
| 4,858,686 A * | 8/1989 | Calleson | B21D 39/06 | 165/151 |
| 5,150,520 A * | 9/1992 | DeRisi | B21D 39/06 | 165/153 |
| 5,168,142 A * | 12/1992 | Gartner | B23K 11/002 | 219/121.64 |
| 5,199,632 A * | 4/1993 | Takeichi | B61D 17/04 | 228/181 |
| 5,364,012 A * | 11/1994 | Davis | B23K 31/02 | 220/565 |
| 5,603,457 A * | 2/1997 | Sidmore | B23K 37/08 | 239/600 |
| 5,749,414 A * | 5/1998 | Damsohn | F28F 9/18 | 165/158 |
| 5,885,318 A * | 3/1999 | Shimizu | C03B 37/0805 | 156/293 |
| 6,416,051 B1 * | 7/2002 | Autz | B23K 26/24 | 219/121.63 |
| 6,770,835 B1 * | 8/2004 | Hengel | B23K 11/006 | 219/117.1 |
| 7,204,520 B2 * | 4/2007 | Mueller | B29C 66/612 | 156/304.2 |
| 7,410,087 B1 * | 8/2008 | Owensby | B23K 37/0435 | 228/44.5 |
| 8,047,740 B2 * | 11/2011 | Christ | B21J 5/066 | 403/270 |
| 8,759,711 B2 * | 6/2014 | Wollmann | B23K 26/0732 | 219/121.63 |
| 8,904,638 B2 * | 12/2014 | Cai | B21D 53/04 | 219/136 |
| 9,636,786 B2 * | 5/2017 | Tsui | B23K 37/0461 | |
| 9,661,985 B2 * | 5/2017 | Maruyama | A61B 1/0011 | |
| 2003/0062343 A1 * | 4/2003 | Ananthanarayanan | B23K 11/002 | 219/107 |
| 2004/0079738 A1 * | 4/2004 | Sakamoto | H01M 2/307 | 219/121.82 |
| 2007/0018452 A1 * | 1/2007 | Lee | F16L 41/084 | 285/189 |
| 2007/0050980 A1 * | 3/2007 | Vetter | B23K 11/14 | 29/890.043 |
| 2008/0096038 A1 * | 4/2008 | Nagano | B23K 20/126 | 428/586 |
| 2008/0190414 A1 * | 8/2008 | Link | B23K 26/24 | 126/651 |
| 2008/0290070 A1 * | 11/2008 | Fleming | B23K 9/0288 | 219/61 |
| 2009/0159570 A1 * | 6/2009 | Chen | B23K 11/0053 | 219/119 |
| 2009/0187076 A1 * | 7/2009 | Maruyama | A61B 1/0011 | 600/138 |
| 2009/0294410 A1 * | 12/2009 | Iwase | B21J 15/025 | 219/91.23 |
| 2009/0308850 A1 * | 12/2009 | Hill | B23K 26/14 | 219/121.64 |
| 2010/0009211 A1 * | 1/2010 | Tsai | B23K 31/02 | 428/596 |
| 2010/0294264 A1 * | 11/2010 | Link | F24J 2/26 | 126/677 |
| 2011/0253727 A1 * | 10/2011 | Petzendorfer | F17C 1/00 | 220/581 |
| 2011/0274229 A1 * | 11/2011 | Hamamoto | G21C 13/036 | 376/203 |
| 2012/0043292 A1 * | 2/2012 | Smith | B61G 9/20 | 213/51 |
| 2013/0199462 A1 * | 8/2013 | Bienentreu | F22B 37/107 | 122/235.14 |
| 2014/0356054 A1 * | 12/2014 | Chang | B23K 26/206 | 403/271 |
| 2015/0048059 A1 * | 2/2015 | Kurosawa | B23P 6/04 | 219/76.14 |
| 2016/0298666 A1 * | 10/2016 | Van Niekerk | F16B 5/08 | |
| 2017/0227149 A1 * | 8/2017 | Maruyama | F16L 13/02 | |

FOREIGN PATENT DOCUMENTS

GB            1434651        5/1976
JP         60061183 A    *  4/1985    ........ B23K 11/0033

* cited by examiner

METHOD OF FORMING A SEALED JOINT BETWEEN A TUBULAR ARTICLE AND A SHEET ARTICLE

TECHNICAL FIELD

A method is disclosed for forming a sealed joint between a tubular article and a sheet article. The disclosed method may for example be used to form a sealed joint between a tube and a thin tank wall, which is penetrated by the tube.

BACKGROUND ART

Making a penetration in a sheet metal wall is a common requirement. Such a penetration is used for example to enable coupling of one end of a conduit to the wall of a fluid storage tank. This enables connection with appliances or other equipment that use or consume fluid held within the storage tank.

Many methods used to perform the task of creating a sealed joint at the penetration are prone to corrosion or introduce significant stresses in the materials.

A common method of forming the joint is by welding in which work pieces are melted and filler material is added to form a weld pool. It has been found, for example for stainless steel articles, that one of the causes for corrosion at a welded joint is the depletion of chromium from the stainless steel as a result of the heat addition. Pickling and/or passivating the surface of the welded joint to remove heat tint and high temperature scale from the weld site may overcome this problem.

The use of manual welding techniques to join a stainless steel tube to a sheet runs into difficulties when the material thicknesses become small, say less than 3 mm, for example 0.55 mm, and great skill is required to achieve a uniform and reliable welded joint. Moreover, the high heat addition for both automated and manual welding usually requires significant post weld treatment.

An example of a method for creating a boss in a sheet article is provided by U.S. Pat. No. 3,939,683, where the frictional heating of a rotating tool is used to pierce the wall of a sheet and simultaneously create a bossed circular hole from displaced softened metal capable of receiving a thread (e.g. see http://www.thermdrill.com). This method requires sufficient heat input and volume of material to be softened to form the bossed hole. The method provides a solid and separable joint, but is understood to require sheet wall thickness of approximately 1 mm or more and involves significant heat addition. Further this method does not form a join between two initially separate articles.

The above described problems in the background art are not intended to limit the application of the method as disclosed herein.

SUMMARY OF THE DISCLOSURE

A general idea of the disclosed method is to provide a sealed corrosion resistant low stress joint between a tubular article and a sheet article. To provide context in one example the tubular article may be in the form of a socket or pipe while the sheet article may be a wall of a thin sheet metal tank. Embodiments of the method may be practiced on articles which are capable of being fusion welded together. The fusion welding is performed at a weld site being at the ends of the articles being joined. A weld pool solidifies to form a bead of material that joins the ends of the articles together at the weld site. Thus the fusion welding results in the two articles in effect being integrated into a single article as the bead forms a continuum between the previously separate and free ends of each article.

Fusion welding can be performed on materials of similar composition and melting point. Thus in one example the disclosed method may be practiced where both articles are made from the same type of material such as, but not limited to, stainless steel. To provide further context the disclosed method may be practiced to provide a sealed joint between a DN15 threaded socket penetration in a wall of grade 316 stainless steel tank with a thin wall.

Embodiments of the method preferably utilise a heat sink for drawing heat produced by fusion welding from the weld site. The heat sink may be provided by one of the articles at the joint. In some embodiments this may be achieved by appropriate relative dimensioning of the thickness of the socket/pipe and the sheet so that one is thicker than the other at the weld site. The thicker article may then act as a heat sink. For example, a circumferential wall of the socket/pipe can be made thicker than the sheet so that the socket/pipe acts as a heat sink. However it is also envisaged that a heat sink may be provided adjacent to the weld by reducing the material thickness at the circumferential tip of the socket. Moreover, the heat sink may be provided as a separate item, such as a plug, and simply be inserted and removed as required to provide the desired effect of facilitating heat transfer away from the weld site. The heat sink improves the controllability of the welding process (in particular for thin walled materials) and reduces the high temperature exposure time of the weld thereby reducing the weld area material degradation and requirements for post weld treatment.

The application of embodiments of the disclosed method of forming a sealed joint is easy to implement, produces reliable joins with a smooth continuous surface between the joined parts and minimises welding heat tint (for stainless steel).

In this specification the term "fusion welding" is intended to encompass metal welding techniques that rely on melting of the articles being joined without the use a filler material. Only a relatively small volume of parent material is raised to melting temperature in a relatively short time, minimizing the size of the heat-affected zone. Examples of fusion welding techniques include, but are not limited to, gas tungsten arc welding, laser beam welding and electron beam welding.

The weld site between the articles to be joined is limited to a very small volume, which in combination with the geometry of the joint reduces post weld residual stresses to a level much lower than for a conventional fillet weld.

In one aspect there is disclosed a method of forming a sealed joint between a tubular article and a thin sheet article where the articles are made of metallic materials that are capable of fusion welding together, the method comprising:
  locating an end of the tubular article in a collar surrounding a hole formed in the sheet article wherein an end of the collar lies flush with a proximal end of the tubular article; and,
  fusion welding an end of the collar to the proximal end of the tubular article about the full circumference of the collar.

In one embodiment the fusion welding is performed to create a volume of molten material that solidifies to form a continuous smooth bead of material that joins the end of the collar and the proximal end of the tubular article.

In one embodiment one of the sheet article and the end of the tubular article located in the collar has a higher rate of thermal energy conduction than the other away from a region adjacent to where the bead is formed.

In one embodiment a circumferential wall of the tubular article at the proximal end has a thickness greater than that of a wall of the collar.

In one embodiment the method comprises providing the thin sheet article with a thickness of up to about 3 mm.

In one embodiment the method comprises forming a recessed seat about the tubular article for seating the collar.

In one embodiment the method comprises forming the recessed seat with a depth in the order of the thickness of a wall of the collar.

In one embodiment the thickness of the circumferential wall is at least 1.5 times the thickness of a wall of the collar.

In one embodiment the method comprises coupling a heat sink to the tubular portion.

In one embodiment the method comprises providing the thickness of the tubular article wall near the end of the tubular article to a thickness similar to the thickness of the wall of the collar.

In one embodiment the method comprises forming, or otherwise providing, the collar to extend in an axial direction for a length of up to 30% of the diameter of the collared hole.

In one embodiment the tubular article is a socket, pipe, tube or conduit.

In one embodiment the tubular and thin sheet articles are made of stainless steel.

In a second aspect there is disclosed a sheet metal article comprising: a hole provided with a collar, the collar having a free end; a tubular article with an end located in the collar, the end of the tubular article lying substantially flush with the free end of the collar; and, a bead of metal formed by fusion welding of the tubular article and the free end of the collar creating a fusion joint between the tubular article and the hole collar about the full circumference of the hole.

In one embodiment the sheet metal article is a tank. The tank may be a water tank for an integral collector storage solar hot water system.

In one embodiment the sheet metal article is a stainless steel tank.

In one embodiment the collar extends in an axial direction for a length of up to 30% of the diameter of the hole.

In one embodiment the thin sheet article has a thickness of up to about 3 mm.

In one embodiment the tubular article is provided with a recessed seat in which the collar is seated.

In one embodiment the recessed seat has a depth in the order of the thickness of a wall of the collar.

BRIEF DESCRIPTION OF THE DRAWINGS

Notwithstanding any other forms which fall within the scope of the method as set forth in the Summary, a specific embodiment will now be described by way of example only, with reference to the accompanying drawings in which.

DETAILED DESCRIPTION OF SPECIFIC EMBODIMENT

Figure 1:
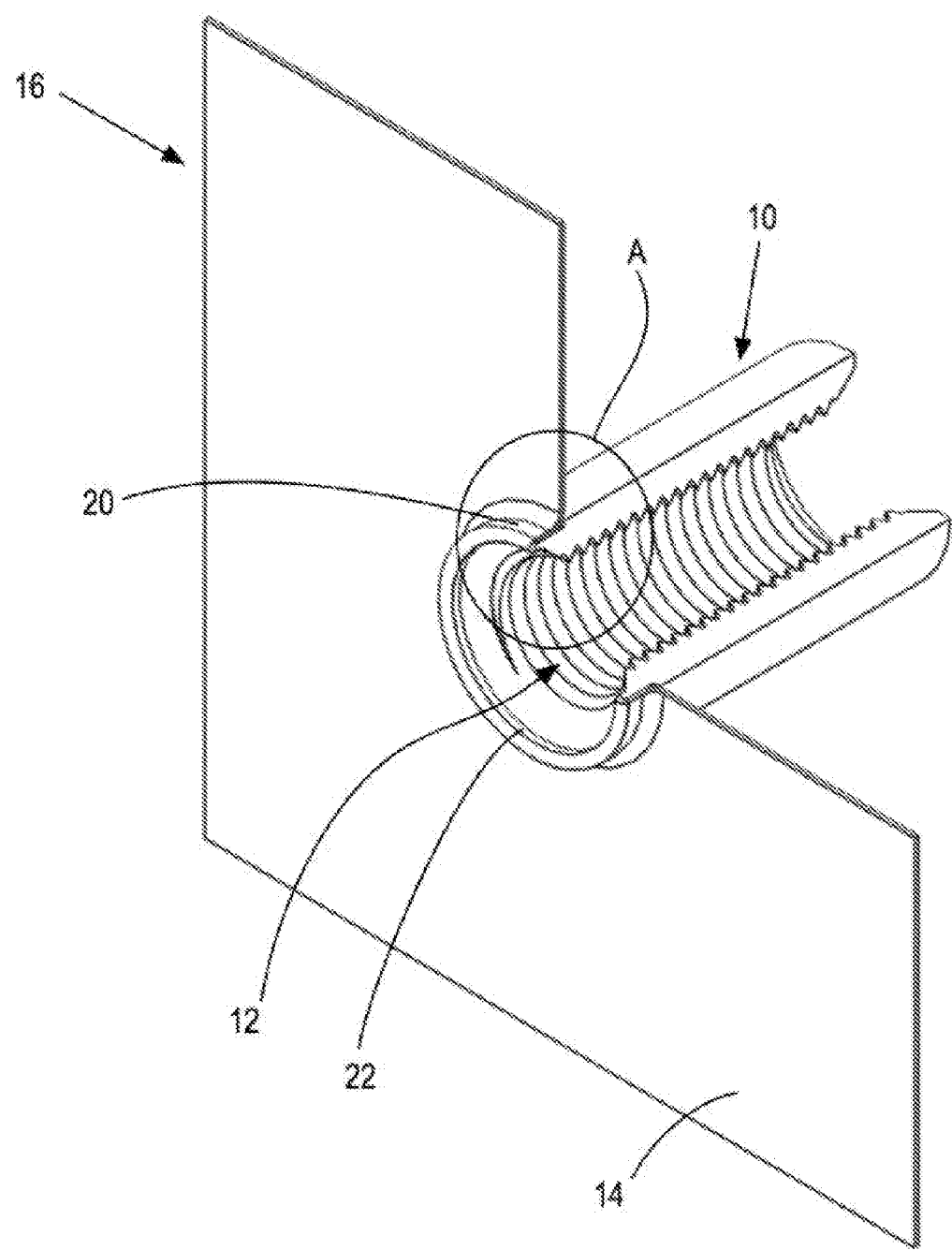
FIG. 1 is a partial cut-away perspective view of a penetration in a sheet metal wall in relation to which an embodiment of the disclosed method may be applied.

FIG. 1 depicts a tubular article in the form of a threaded socket 10, which penetrates through a hole 12 of a sheet article. The sheet article is a sheet metal wall 14 of a stainless steel tank 16 used in, for example, an integral collector storage solar hot water system. The socket 10 in this example is a DN15 threaded socket. While the tubular article is exemplified in this embodiment as a socket 10, it may take other forms such for example a pipe or tube, one end of which is to be joined to the wall 14 of tank 16. The sheet wall 14 is relatively thin, for example, having a having a thickness up to or less than about 3 mm. In a specific embodiment sheet article has a thickness of about 0.55 mm.

The hole 12 is surrounded by or formed with a circumferential collar 20. The collar 20 extends in an axial direction for a distance D1 from the plane of the wall 14.

In one embodiment of the method the hole 12 and collar 20 are already provided or pre-exists in the wall 14. However in an alternate embodiment the method may include a step of forming the hole 12 and/or collar 20 in the tank wall 14, say through a dimpling operation or with a tee-extractor plumbing tool.

Irrespective of whether the hole 12/collar 20 pre-exists or are created as part of an embodiment of the method, the method entails locating an end 22 of the socket 10 in the collar 20. Optionally, one of the collar 20 and socket 10 may have a higher rate of thermal energy conduction than the other away from an interface region 23 between the collar 20 and the socket 10.

Fusion welding entails partially melting both of the collar 20 and the socket 10 so that on cooling and re-solidification the melted portions form a single integral structure or bead 26. Fusion welding is applicable to materials of similar composition and melting points. In this example this is achieved by ensuring that the tank wall 14 and the socket 10 are made of the same type of material, such as for example stainless steel.

The end 22 of the socket 10 is positioned to lie flush with an end 24 of the collar 20. With the ends 22 and 24 being substantially flush with each other a sealed joint is formed between the collar 20 and the socket 10 by the fusion welding.

The fusion welding creates a fusion joint at the previously free and separate ends 22 and 24 of the collar 20 and socket 10. The fusion joint is manifested by a bead 26 of material made from molten material sourced from the ends of the collar 20 and the socket 10. The bead 26 extends circumferentially about the radial faces of the ends 22 and 24. That is, the bead 26 forms an integral joint at the free ends 22 and 24 so that in effect the previously separate two articles become a single piece. The bead 26 has a very small volume, which enables rapid heating and cooling of the weld. In combination with the smooth bead surface this produces a corrosion resistant and high quality joint.

The end 22 of the socket 10 has a circumferential wall 28. The heat transfer characteristics of the circumferential wall 28 and/or the collar 20 are such that the weld temperature is reached rapidly, yet sufficient heat is drawn from the ends 22 and 24 so as to minimise or reduce the high temperature exposure time thereby reducing heat tint for stainless steel. In this way the one or both of the socket 10 and wall 14 can act as a heat sink. This can be achieved by arranging the thickness of the wall 28 and the wall of the collar 20 to be similar to each other. Here "similar" is intended to mean that the respective wall thicknesses are either substantially the same or that the thicker of the two walls is no more than one and half to two times the thickness of the thinner of the two walls.

For example in the illustrated embodiment, but not necessarily all embodiments, the socket 10 can act as a heat sink by arranging, at the interface region 23, the thickness $T_1$ of the circumferential wall 28 to be similar to (in this instance about 1.5 times) the thickness $T_2$ of a wall of the collar 20. In this manner the wall 28 can provide an appropriate thermal resistance between the ends 22 and 24 and the more massive portion of socket 10.

By providing such a ratio of relative thickness the socket 10 acts as a heat sink sufficient to minimise or reduce heat tinting but not sufficient so as to adversely affect the fusing together of the socket 10 and sheet 14. Thinning the wall thickness of the socket adjacent to the weld site 26, as shown in FIG. 2, may allow an increase in the relative thermal capacity of the heat sink on the socket side.

Figure 2:
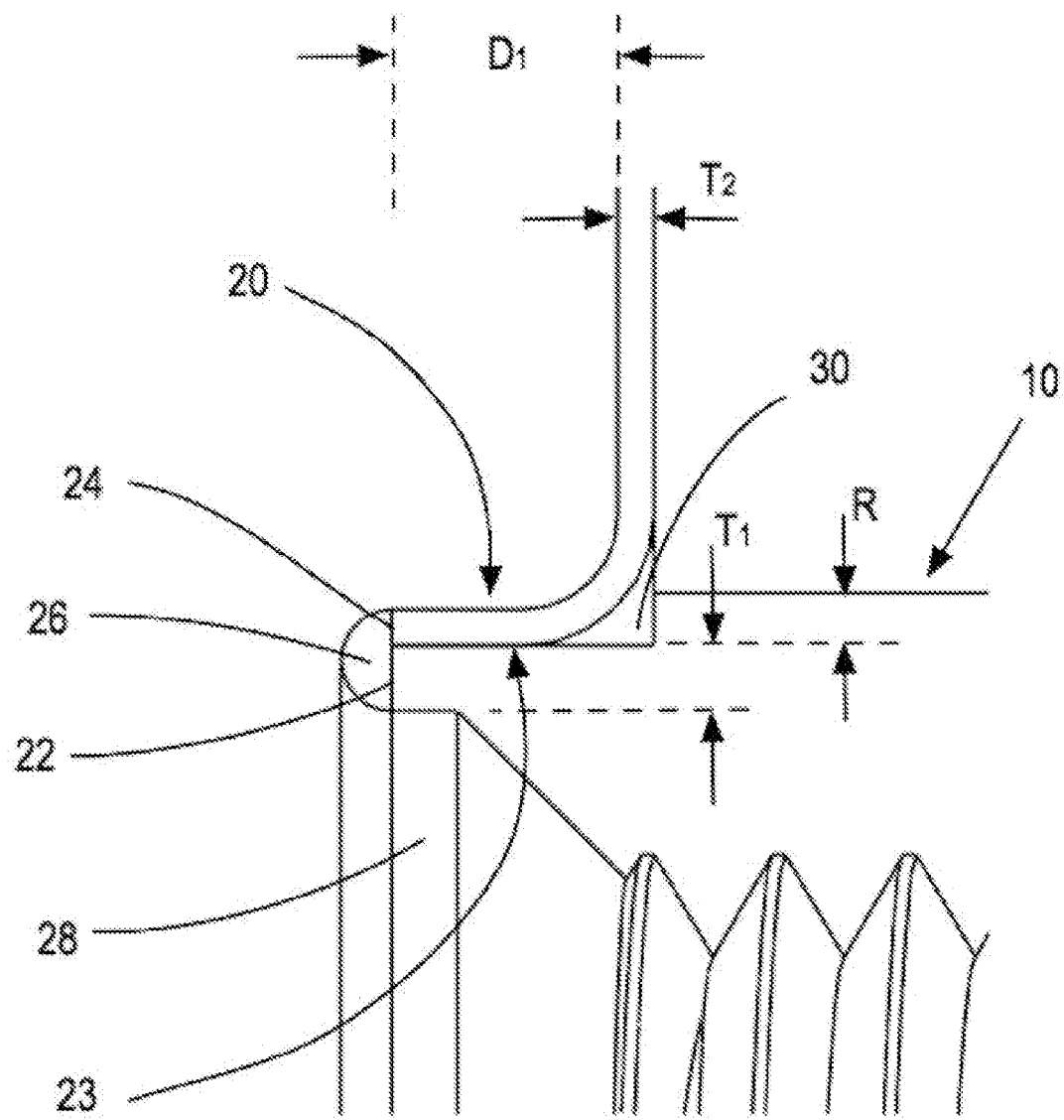
FIG. 2 is an enlarged view of detail A from FIG. 1.
Figure 3:
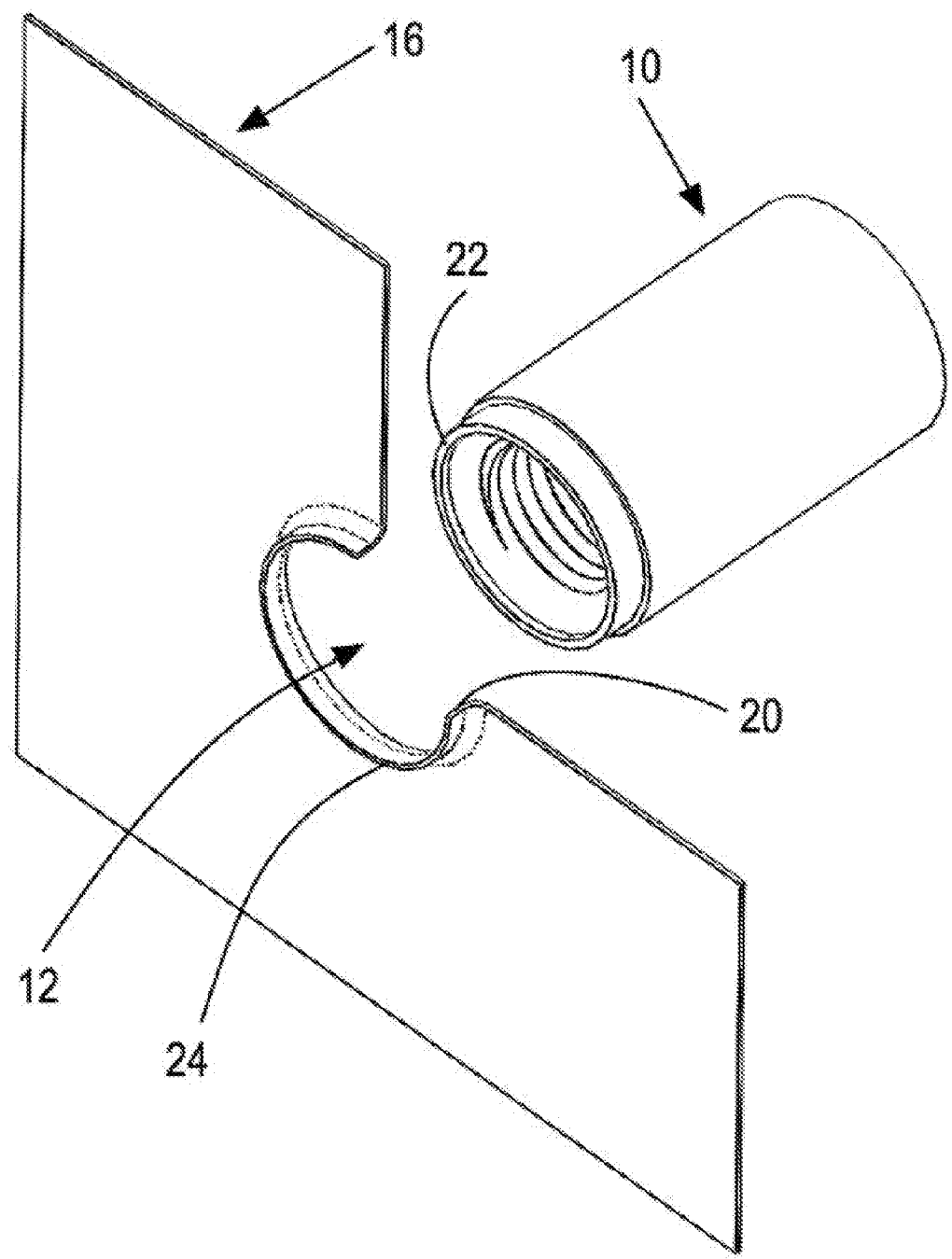
FIG. 3 is an open and in line for assembly view of the two parts to be welded together.

In this embodiment as shown in FIG. 2 a recessed seat 30 is formed in the circumferential wall 28 of the socket 10. The recess seat is provided for seating the inner circumferential surface of the collar 20. The seat 30 and an inner diameter of the collar 20 may be arranged so as to provide a slight interference fit. In the present embodiment the recessed seat 30 is formed to a depth $R \geq T_2$. However it should be understood that a recess is not an essential requirement in order to practice embodiments of the method.

For some, but not necessarily all embodiments the collar 20 can be provided or otherwise formed so that its axial length $D_1$ is up to about 30% of the diameter of the hole 12. For example in one specific embodiment the distance $D_1$ may be 15% of the hole diameter.

In one specific example of an application of the disclosed method, the method may be applied to produce a DN15 threaded socket penetration in a wall of a 0.55 mm thick Grade 316 open vented hot water storage tank. In such an embodiment the hole 12 has a diameter of 25 mm and the collar 20 extends for a distance $D_1$ of about 3 mm. The fusion welding of the collar 20 and socket 10 may be performed with a high-speed pass of a gas tungsten arc welder without addition of any filler wire or with a laser-welding machine.

Whilst a specific embodiment has been described it should be appreciated that the method may be embodied in other forms. For example the method may entail forming the hole 12 and collar 20 by an extrusion process. Also, embodiments of the method may be practiced by providing a removable heat sink, which is inserted into the socket 10 prior to the fusion process and removed subsequent thereto. Further, while stainless steel is mentioned as a possible material from which the articles 10 and 14 may be made other materials can be used. Also it is not critical that materials from which the articles are made be identical. They merely require similar composition and melting points. For example the tank 16 and/or wall 14 may be made from USN No. S44400 Grade ferritic stainless steel while the socket 10 may be made from USN No. S31603 Grade low carbon austenitic stainless steel. Also while in the specific embodiment the wall 14 is states as having a thickness of about 0.55 mm, other thickness are possible, such as: any thickness less than 3 mm; or any range of thickness between 3 mm and 0.1 mm, including any sub range within that range such as 0.3 mm to 1 mm.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence of addition of further features in various embodiments of the method as disclosed herein.

The claims of the invention are defined as follows:

1. A method of forming a sealed joint between a tubular article and a sheet article wherein the articles are made of metallic materials that are capable of fusion welding together, the method comprising:
    locating an end of the tubular article in a collar surrounding a hole formed in the sheet article wherein an end of the collar lies substantially flush with the end of the tubular article and wherein a recessed seat is formed about the tubular article for seating the collar; and,
    fusion welding the end of the collar to the end of the tubular article about a full circumference of the collar by application of heat without use of a filler material.

2. The method according to claim 1 wherein the fusion welding is performed to create a volume of molten material from the collar and the tubular article that solidifies to form a continuous bead of material that joins the end of the collar and the end of the tubular article.

3. The method according to claim 2 wherein the end of the tubular article has a higher rate of thermal energy conduction than the sheet article, away from a region adjacent to where the bead is formed.

4. The method according to claim 1 wherein a circumferential wall of the tubular article at the end has a thickness greater than that of the collar.

5. The method according to claim 1 wherein the sheet article has a thickness of up to about 0.3 mm to 1 mm.

6. The method according to claim 1 comprising forming the recessed seat with a depth in the order of the thickness of a wall of the collar.

7. The method according to claim 4 wherein the thickness of the circumferential wall is at least 1.5 times the thickness of a wall of the collar.

8. The method according to claim 1 comprising coupling a heat sink to the tubular portion.

9. The method according to claim 1 comprising reducing the thickness of the tubular article wall near the end of the tubular article to a thickness substantially the same as, or no more than one and half to two times, the thickness of the collar.

10. The method according to claim 1 comprising forming the collar to extend in an axial direction for a length of up to 30% of the diameter of the hole.

11. The method according to claim 1 wherein the tubular article is selected from the group consisting of: a socket, pipe, tube or conduit.

12. The method according to claim 1 wherein the tubular and sheet articles are made of stainless steel.

13. A sheet metal article comprising: a hole provided with a collar, the collar having a free end; a tubular article with an end located in the collar wherein the tubular article is provided with a recessed seat in which the collar is seated, the end of the tubular article lying substantially flush with the free end of the collar; and, a bead of metal formed by fusion welding, without the use of a filler material, of the tubular article and the free end of collar creating a fusion joint between the tubular article and the collar about a full circumference of the collar.

14. The sheet metal article according to claim 13 wherein the sheet metal article is a tank.

15. The sheet metal article according to claim 14 wherein the tank is a water tank for an integral collector storage solar hot water system.

16. The sheet metal article according to claim 13 wherein the collar extends in an axial direction for a length of up to 30% of the diameter of the hole.

17. The sheet metal article according to claim 13 wherein the sheet article has a thickness of up to about 0.3 mm to 1 mm.

18. The sheet metal article according claim 13 wherein the recessed seat has a depth in the order of the thickness of a wall of the collar.

19. The sheet metal article according to claim 13 comprising arranging the thickness of the tubular article wall near the end of the tubular article to be of a thickness substantially the same as, or no more than one and half to two times, the thickness of the collar.

20. The method according to claim 1 wherein the fusion welding is formed with a pass of a gas tungsten arc welder or a laser welding machine.

* * * * *